(12) United States Patent
Schriefer et al.

(10) Patent No.: US 8,706,981 B2
(45) Date of Patent: Apr. 22, 2014

(54) CONFIGURABLE STATUS PROCESSING UNIT FOR SENSOR-ACTUATOR SYSTEMS

(75) Inventors: Jörn Schriefer, Griesheim (DE); Jürgen Scherschmidt, Frankfurt (DE); Thomas Peichl, Wöllstadt (DE)

(73) Assignee: Continental Teves AG & Co. oHG (DE)

( * ) Notice: Subject to any disclaimer, the term of this patent is extended or adjusted under 35 U.S.C. 154(b) by 181 days.

(21) Appl. No.: 13/146,443

(22) PCT Filed: Feb. 3, 2010

(86) PCT No.: PCT/EP2010/051323
§ 371 (c)(1),
(2), (4) Date: Dec. 16, 2011

(87) PCT Pub. No.: WO2010/089332
PCT Pub. Date: Aug. 12, 2010

(65) Prior Publication Data
US 2012/0079218 A1    Mar. 29, 2012

(30) Foreign Application Priority Data

Feb. 3, 2009   (DE) .......................... 10 2009 007 200

(51) Int. Cl.
*G06F 12/00*     (2006.01)
*G06F 7/76*      (2006.01)
(52) U.S. Cl.
CPC ..................................... *G06F 7/764* (2013.01)
USPC ......................................................... 711/156
(58) Field of Classification Search
CPC ..................................................... G06F 7/764
See application file for complete search history.

(56) References Cited

U.S. PATENT DOCUMENTS

| 2004/0232770 | A1 | 11/2004 | Gisy |
| 2009/0019146 | A1 | 1/2009 | Tegnell |
| 2009/0326852 | A1 | 12/2009 | Vetter |

FOREIGN PATENT DOCUMENTS

| WO | 02096707 | 12/2002 |
| WO | 2007077189 | 7/2007 |

OTHER PUBLICATIONS

International Search Report issued in PCT/EP2010/051323 filed Feb. 3, 2010, mailed May 21, 2010.

*Primary Examiner* — Hiep Nguyen
(74) *Attorney, Agent, or Firm* — RatnerPrestia

(57) ABSTRACT

An electronic communication unit which is in the form of a sensor and/or actuator unit, including at least a first status information processing module having a status memory unit which stores status information for the communication unit in the form of a status data item (stat), wherein the first status information processing module further includes a masking memory unit connected to the status memory unit and also a status processing element connected to the masking memory unit, wherein the first status information processing module is designed such that at least one status information item from the status data item (stat) is selected by the masking memory unit and the resultant selective status data item (sel-stat) is processed by the status processing element such that the output of the latter provides a short status data item (k-stat) which has a shorter data word length than the selective status data item (sel-stat).

12 Claims, 2 Drawing Sheets

CONFIGURABLE STATUS PROCESSING UNIT FOR SENSOR-ACTUATOR SYSTEMS

CROSS REFERENCE TO RELATED APPLICATIONS

This application is the U.S. National Phase Application of PCT International Application No. PCT/EP2010/051323, filed Feb. 3, 2010, which claims priority to German Patent Application No. 10 2009 007 200.4, filed Feb. 3, 2009, the contents of such applications being incorporated by reference herein.

FIELD OF THE INVENTION

The invention relates to an electronic communication unit, to a method for transmitting status information and to the use of the communication unit in motor vehicles.

BACKGROUND OF THE INVENTION

An aspect of the invention is to propose an electronic communication unit and also a method for transmitting status information which requires only a relatively small bandwidth and which operates particularly effectively.

SUMMARY OF THE INVENTION

The invention achieves this object by means of the communication unit.

The masking memory unit preferably comprises a logic circuit or a selection circuit which is used to logically combine the status data item at the input with the bit mask stored in the masking memory unit, as a result of which the selective status data item is produced. This logic circuit or selection circuit particularly comprises an AND logic circuit, which is particularly preferably designed such that each bit of the status data item is ANDed with a respective bit of the bit mask.

The first status information processing module preferably additionally has a short status memory unit which is connected to the status processing element and to which the short status data item is written.

The communication unit preferably comprises an interface unit which is connected to the output of the status processing element or to the output of the short status memory unit of the first status information processing module and is connected to the masking memory unit of the first status information processing module such that it can change and/or overwrite the bit mask stored in the masking memory unit, as a result of which it is possible to customize the selection of the status types about which the interface unit is provided with information in the form of the short status data.

As an alternative preference, the short status memory unit is integrated in the interface unit.

It is preferred that the interface unit is furthermore connected to the status memory unit of at least the first status information processing module such, and is designed such, that it can write to said status memory unit, as a result of which it is possible to write a test status data item to the status memory unit. For this, the interface unit particularly has a test unit which is designed such that it automatically provides test data or forwards and/or processes test data, particularly preferably test data which are provided by a second communication unit.

The interface unit is expediently designed such that it automatically evaluates the result of test data processed by at least one status information processing module. Expediently or as an alternative preference, the communication unit has at least one signal processing unit which produces and/or provides particularly a test module in addition or as an alternative to the test unit of the interface module.

The communication unit preferably additionally has at least a second, redundant status information processing module which is essentially designed on the basis of the first status processing module and is likewise connected to the interface unit in essentially the same way.

The communication unit is preferably part of a communication system and connected to at least one second communication unit, wherein the interface unit of the first communication unit is designed such that it can transmit to the second communication unit the short status data item from the first and/or the second status information processing module and/or a total short status data item derived from one or both of said data items. The interface unit of the first communication unit is particularly designed such that it writes a test status data item received from the second communication unit directly or in modified form to the status memory unit of the first and/or second status information processing module or changes a status data item stored therein in line with or on the basis of test data and then transmits at least one of the resultant short status data items and/or a total short status data item derived therefrom to the second communication unit.

The expression "the communication unit" itself, that is to say without numbering, expediently always means the first communication unit, which is in the form of a sensor and/or actuator unit.

The status memory units of the first and second status information processing modules are expediently connected such and/or are actuated such that the respective status data for the said two status memory units are in the form of mutually inverted data words, at least in relation to status information which the communication unit itself provides. In particular, the masking memory units of the first and second status information processing modules are connected such and/or are actuated such that the respective bit masks of said two masking memory units are in the form of mutually inverted data words.

Preferably, the communication system having at least the first and the second communication unit is designed such that the first communication unit has a counter memory unit which stores a counter value, wherein the first communication unit is designed such that at least the occurrence of a first defined communication event prompts the counter value in the counter memory unit to be changed in at least one defined first manner, wherein at least the occurrence of a defined reference event is followed by the counter value in the counter memory unit being changed in at least one defined second manner, wherein at least in the course of a second defined communication event the first communication unit transmits the current counter value in the counter memory unit directly or indirectly to the second communication unit. The communication system and the method are designed particularly to increase the dependability in an electronic system.

The term dependable is preferably understood to mean the term "fail-safe" and/or "fail-silent".

The description of the occurrence is preferably understood to mean after the occurrence.

The first and second communication events are preferably defined as a communication event which occurs or can occur at least in the communication between the first and second communication units.

The counter memory unit is preferably designed such and/or is preferably actuated such that the counter value is changed in the defined first manner by a defined step size using a mathematical operation. The mathematical operation is particularly understood to mean addition or multiplication or a more complex operation, and the step size is understood to mean, for example, the value by which the counter value is incremented or decremented, particularly preferably the value one or the value which is multiplied by the counter value.

The counter memory unit is preferably designed such and/or is actuated such that each communication event between communication units in the communication system, such as the first and second communication units, prompts the counter value in the counter memory unit to be changed in the defined first manner. With particular preference, the first communication event is defined such that each communication event between communication units in the communication system is handled at least as a defined first communication event.

It is preferred that the counter memory unit is designed and/or actuated as a counter unit, wherein the change in the counter value in the defined second manner is in the form of a reset operation for the counter unit. This reset operation prompts the counter value to be reset particularly to a defined value, with particular preference the value "0".

The first communication unit preferably has at least one first and a second data memory unit and is designed such that at least the occurrence of the first defined communication event prompts the current data item in the first data memory unit to be written to the second data memory unit and prompts the counter value in the counter memory unit to be changed in the defined first manner. By way of example, this corresponds to the embodiment for a special mode of operation, which is referred to as a continuous mode of operation or "continuous mode" and which particularly preferably does not involve the counter value in the counter memory unit being reset.

As an alternative preference, the first communication unit has at least one first and a second data memory unit and is designed such that the occurrence of a defined trigger event, particularly a defined third communication event or an internal trigger event, is followed by the current data item in the first data memory unit being written to the second data memory unit and, with particular preference thereafter, the counter value in the counter memory unit being changed in the defined second manner. With quite particular preference, the writing of the current data item in the first data memory unit to the second data memory unit is followed by the then stored data in the first and second data memory units being compared in a transfer unit. The comparison result of this comparison is used further as status information.

It is preferred that the first communication unit is designed such that in the course of at least the second defined communication event between at least the first and second communication units the current data item in the second data memory unit is transmitted from the first communication unit to the second communication unit.

It is expedient that the second communication unit is in the form of a master unit and at least the first communication unit is in the form of a slave unit, and these are connected to one another by a bus system.

The first communication unit is preferably in the form of a sensor unit and/or actuator unit which, in particular, senses at least one measured variable and provides at least one measured variable data item.

The second communication unit is preferably in the form of an electronic control unit, particularly in the form of an electronic control unit in a motor vehicle braking system and/or a motor vehicle electronic stability control system.

The second communication unit expediently likewise has at least one status information processing module and also an interface unit and provides appropriate short status data or total short status data for the first communication unit.

It is preferred that the counter memory unit is designed and actuated such that the counter value is designed to be able to be used as a time stamp and/or that the counter value forms or provides a time measure for synchronizing the communication system.

The reference event is preferably defined as the, in particular, successful write operation for the data item in the first data memory unit to the second data memory unit.

The third defined communication event is preferably defined as a data query or "sample command" from the second communication unit at least to the first communication unit, particularly to all further communication units in the communication system.

The internal trigger event is preferably defined as the exceeding or undershooting of a measured value or parameter in the first communication unit.

The second defined communication event expediently comprises data access by the second communication unit at least to the first communication unit, which involves the current counter value and also the data item currently stored in the second data memory unit being transmitted or sent, in particular together, from the first communication unit to the second communication unit.

The method for transmitting status information is preferably developed further by virtue of the at least one short status data item being transmitted to the second communication unit by an interface unit. It is then particularly preferred that the second communication unit interprets the short status data item to determine whether the short status data item contains an information item indicating that the second communication unit needs to react thereto, after which, if the presence of such an information item to which the second communication unit needs to react is identified, the second communication unit requests or reads at least the status data item in the first and/or the second status information processing module and/or the second communication unit automatically puts itself into another mode of operation, particularly into an emergency mode of operation. The second communication unit is quite particularly preferably designed such that it stores information for the purpose of interpreting the at least one short status data item and/or the total short status data item.

Furthermore, the method is expediently developed further by virtue of the communication between the first and second communication units being synchronized by virtue of the first communication unit having a counter memory unit which stores a counter value, wherein the occurrence of a first defined communication event prompts the counter value in the counter memory unit to be changed in at least one defined first manner and wherein the occurrence of a defined reference event prompts the counter value in the counter memory unit to be changed in at least one defined second manner, wherein at least in the course of a second defined communication event the first communication unit transmits at least the current counter value in the counter memory unit directly or indirectly to the second communication unit.

The method for synchronizing the communication is expediently developed by virtue of the first communication unit having at least one first and a second data memory unit, wherein the occurrence of a defined trigger event, particularly a defined third communication event or an internal trigger event, is followed by the current data item in the first data memory unit being written to the second data memory unit and by the counter value in the counter memory unit being changed in the defined second manner, and wherein the occurrence of the defined second communication event is followed by the current data item for the second data memory unit being transmitted or sent at least from the first communication unit to the second communication unit.

The invention also relates to the use of the communication unit or of the communication system in motor vehicles, particularly in a motor vehicle braking system and/or in a motor vehicle electronic stability control system.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
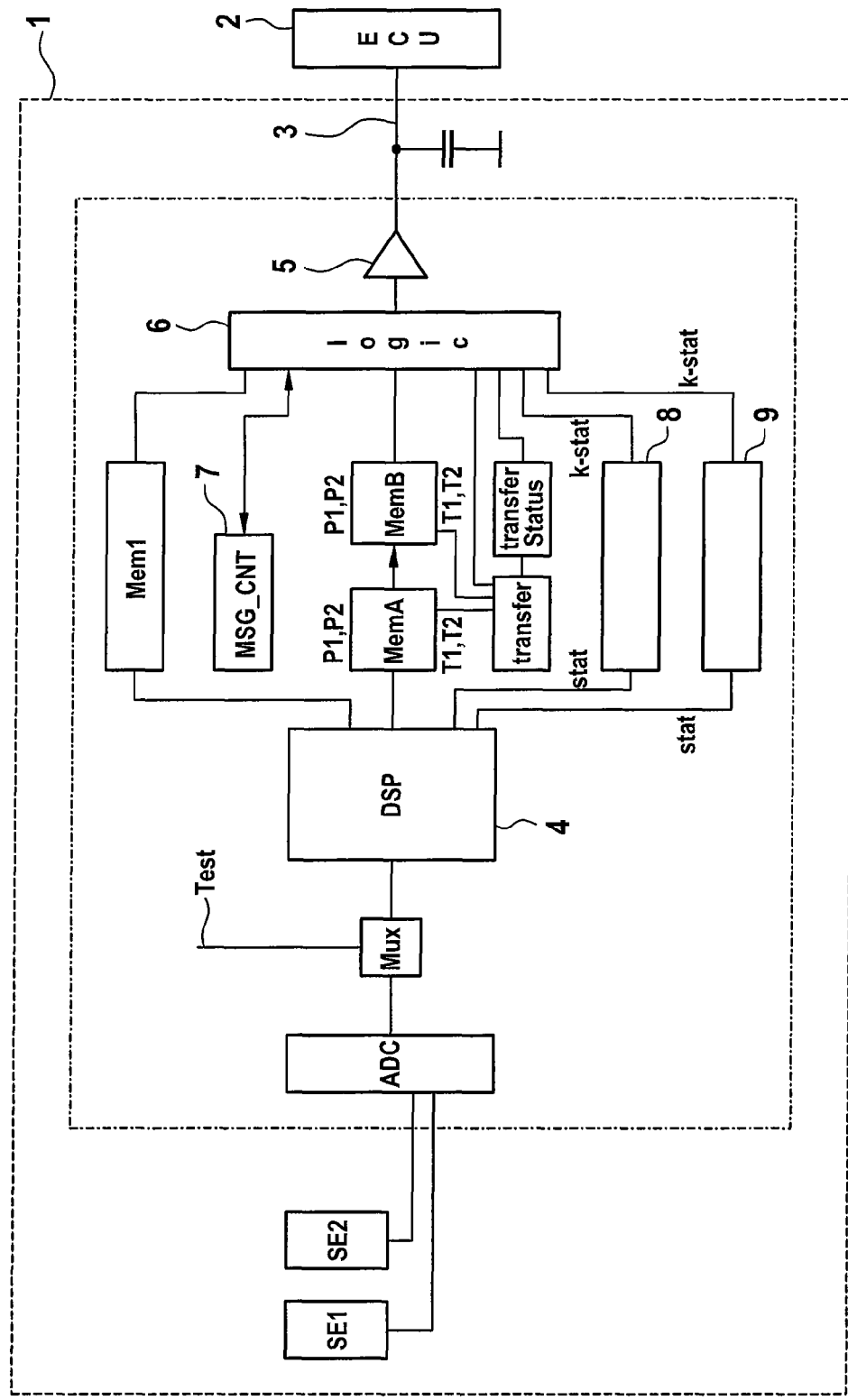
FIG. 1 shows an exemplary embodiment of a communication system with a first and a second communication unit, wherein the first communication unit is in the form of a sensor unit and comprises a counter memory unit.

FIG. 1 shows an exemplary dependable communication system, comprising a first communication unit 1, for example in the form of a pressure sensor unit, which is connected by means of data transmission link 3 to a second communication unit 2, which is in the form of an electronic control unit ECU. In this case, the sensor unit 1 has two pickups SE1, SE2, in line with the example two pressure sensor elements. These are connected to an analog/digital converter ADC which, by way of example, provides two digital pressure values P1, P2 and two digital temperature values T1, T2 per measurement. This analog/digital converter ADC is connected by means of a multiplexer Mux to a signal processing unit 4, for example in the form of a digital signal processor DSP. Furthermore, the multiplexer Mux is also used to supply at least one further signal line, for example test signal lines Test, to the signal processing unit 4. For the principal information or pressure information P1, P2 which the sensor unit 1 needs to deliver to the control unit 2, the sensor unit 1 has a first and a second serial data memory unit MemA and MemB for the purpose of synchronization. In this case, for each measurement/evaluation operation or cycle, the principal information, for example two digital pressure values P1, P2 and two digital temperature values T1, T2, is written to the first data memory unit MemA, which is used as a buffer store. This always involves the first data memory unit MemA being overwritten. In line with the example, the signal processing unit 4 automatically writes to the first data memory unit MemA when there are new data available.

The sensor unit 1 has a counter memory unit 7 which stores a counter value (message counter) MSG_CNT which corresponds to a time stamp or time measure for synchronous communication within the communication system. At least a first communication event, in line with the example every communication event between the first and second communication units, prompts the counter value to be changed in a defined first manner. In line with the example, this is done by means of actuation by the interface unit 'logic', 6. The counter memory unit 7 is designed as a counter unit, and the actuation in the first manner is defined—in line with the example—as incrementation of the counter value by 1.

A data query or a "sample command" from the second communication unit 2, ECU, which, in line with the example, is defined as a third communication event, is interpreted by the sensor unit 1 as a trigger event, after which the sensor unit 1 transmits or writes the current data item in the first data memory unit MemA to the second data memory unit MemB. Such a successful write operation from MemA to MemB after the trigger event is defined as a reference event, the occurrence of which is followed by the counter value in the counter memory unit 7 or counter unit being changed in the defined second manner, which, by way of example, corresponds to the counter value being reset to the value "0". As a result, the query operation by the second communication unit ECU is linked to the reset of the counter value for the purpose of synchronization. There then follows data access or a read command by the second communication unit, for example, which access or command is defined as a second communication event. The data item currently stored in the second data memory unit MemB and the current counter value are then transmitted from the sensor unit 1 to the control unit ECU, 2. This transmission is effected by the interface unit 'logic', 6, and—in line with the example—the driver unit 5 connected downstream thereof.

The control unit 2 thus triggers the data transmission with the third communication event in order to select the current data at the exact request time in each case—the current data item in the first data memory MemA is written to the second data memory MemB. This data item from MemB is then made available to the driver unit 5 together with the current counter value via the interface unit 6, 'logic', after data access by the ECU, which is defined as a second communication event, and said driver unit transmits these data via the data transmission link 3 to the control unit 2.

The signal processing unit 4 furthermore provides status information stat which is supplied to a first and a redundant second status information processing module 8 and 9, which are connected to the interface unit 'logic' 6. These two status information processing modules 8, 9 allow efficient and resource-saving transmission of status information from the sensor unit 1 to the control unit 2.

Sensor unit 1 additionally has a central memory unit Mem1 which—in line with the example—is designed as an EEPROM unit and which stores defined operating parameters for the sensor unit. This central memory unit Mem1 is likewise connected to the signal processing unit 4 and to the interface unit 'logic'.

In line with the example, the memory units MemA and MemB each comprise a register for each principal information data item P1, P2, T1 and T2.

The central memory unit Mem1 optionally comprises a hardware identification information item ID which the control unit ECU can query and which can be used to explicitly identify the sensor unit 1. This makes it possible to avoid the use of a sensor unit—not provided—in interaction with a particular control unit, for example.

In order to further increase dependability, provision is optionally made for the control unit ECU to compare the pressure values P1 and P2 captured by the pressure sensor element SE1 and SE2 and provided by the signal processing unit 4 for the purpose of plausibility checking. The analog/digital converter ADC and/or the signal processing unit 4 cannot be ruled out from influencing the pressure signals in a similar, undesirable manner. Therefore, the pressure values P1 and P2 are—in line with the example—represented or encoded in different manners, for example as data with inverse coding relative to one another or by a relative offset which is known to the control unit 2.

Furthermore, at defined times, for example in a test mode of the sensor unit 1, one or more test data items are provided on test signal lines Test and allow the control unit 2 to check whether, by way of example, filter parameters or other signal processing functions of the signal processing unit 4 are working correctly. In line with the example, the control unit 2 prescribes these test values at runtime in each case or initializes a BIST (build-in self test)—implemented completely in the sensor unit 1—with appropriately stored test vectors or test data, these or the output data associated therewith being known to the control unit 2.

So as to be optionally able to additionally recognize an erroneous select line or the function thereof in the multiplexer Mux, the pressure values P1 and P2 are checked for plausibility in the control unit 2, in particular directly following the processing of test data, for example using a pressure model or using particular threshold values/differential value thresholds. This plausibility check on at least the pressure values P1 and P2 can be performed by way of example on a "braking system level" when the communication system described here is part of a motor vehicle braking system and the sensor unit 1 captures braking pressure values and the control unit 2 is designed as the electronic control unit of the braking system.

The time base of the time stamp or the respective current counter value is known both to sensor unit 1 and to the control unit ECU. This time stamp allows possible sample/timing and/or synchronization errors to be recognized, in particular for the data transmission via the data transmission link 3.

By way of example, the data transmission link 3 merely comprises a single data transmission line.

The data memory units MemA, MemB optionally have an associated transfer unit 'transfer', for example, which comprises a logic circuit which is used to compare the data in the memory MemA directly before the transmission of the data in the buffer store MemA to the memory MemB with the data in the memory MemB directly after this very transmission. The result is written to a status register 'transfer status'. Furthermore, the transfer unit 'transfer' has a test logic circuit which is used to test the logic circuit. In line with the example, the transmission of the data from MemA to MemB and/or the transfer unit is/are additionally checked by the transmission of test data from MemA to MemB.

Figure 2:
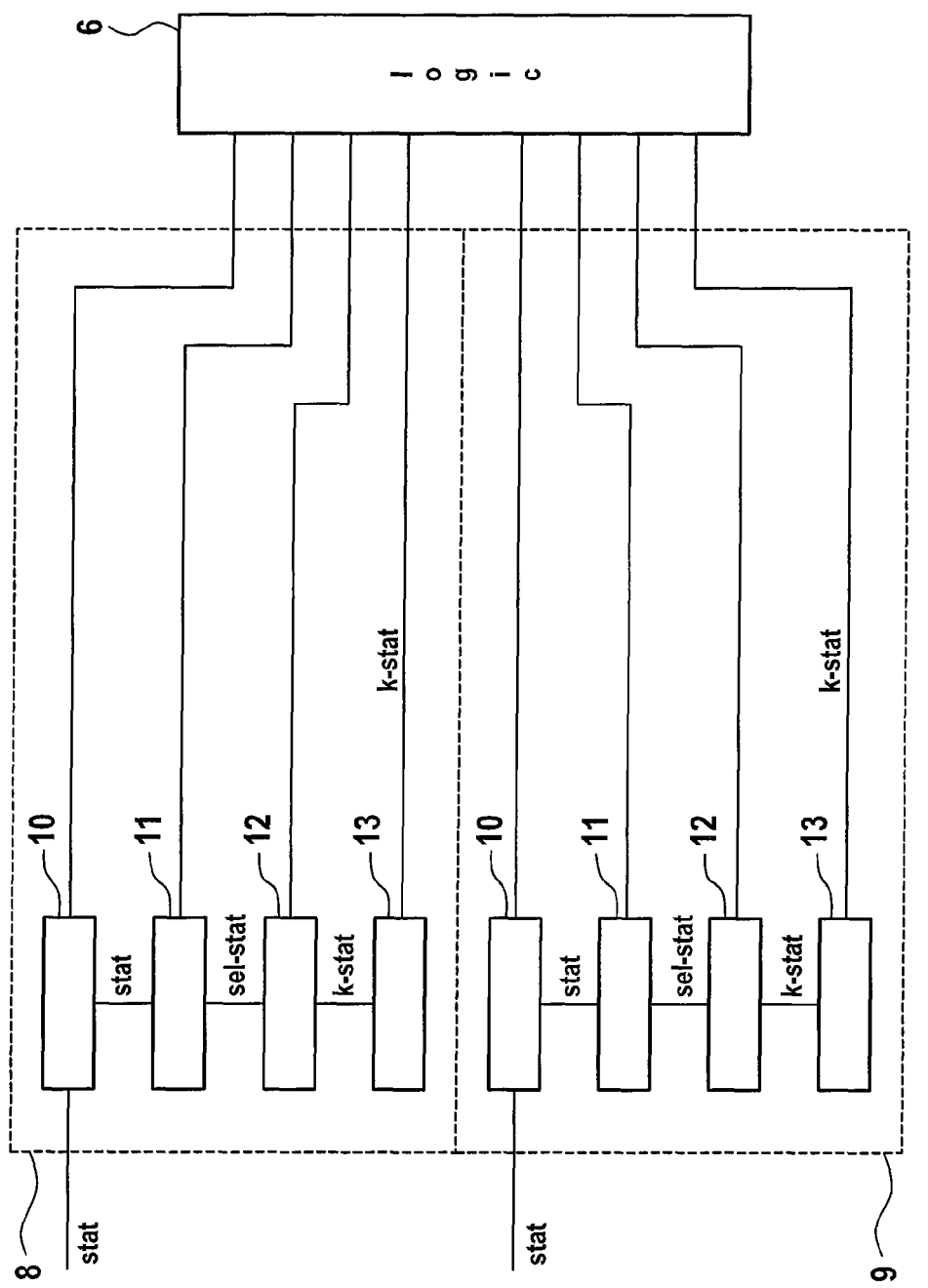
FIG. 2 shows the exemplary design of a first and a second status information processing module and the connection thereof to an interface unit.

FIG. 2 is used to illustrate the design and actuation of the redundant status information processing modules 8 and 9 of the sensor unit. These respectively comprise a status memory unit 10, a masking memory unit 11, a status processing element 12 and, in line with the example, a short status memory unit 13, which is/are alternatively each or jointly integrated in the interface unit 6, 'logic', for example. The status memory unit 10 is supplied with the respective status data item stat, in line with the example by the signal processing unit 4, which is not shown here, and said status data item is stored in the status memory units 10. These make the status data item stat available to the respective masking memory unit 11, which stores a bit mask and in which the status data item stat is ANDed with the respective bit mask, as a result or which the bit mask selects defined status bits or status information. For this purpose, the masking memory unit 11 has a respective logic circuit—not shown—or a selection circuit. This logic circuit or selection circuit comprises particularly an AND logic circuit which, in line with the example, is designed such that each bit of the status data item is ANDed with a respective bit of the bit mask.

The resultant selective status data item sel-stat is processed in the status processing element 12, so that a short status data item k-stat is provided, which has a shorter data word length than the selective status data item sel-stat. In line with the example, the status processing element 12 is designed such that it ORs the individual bits of the selective status data item sel-stat. The short status data item k-stat is stored in a short status memory unit 13 and made available to the interface unit 6. In line with the example, the exemplary ORing of the individual bits of the selective status data item means that the short status data item k-stat comprises only one bit, which contains an information item indicating whether one or more, that is to say whether at least one, of the status bits which are selected by the masking memory unit has/have the value "1". The short status data item k-stat in each status information processing module 8, 9 or a common total short status data item is sent to the second communication unit—which is not shown here. If the latter identifies the occurrence of an error or of an undesirable status, the interface unit 6 reads one of both of the status memory units and sends the respective complete status data item to the second communication unit. The interface unit 6 is designed and connected to the masking memory unit 12 such that read and write access are possible. The write access or the changing or writing of the bit mask allows the selection of the individual status bits of the status data item to be prescribed.

By way of example, the interface unit 6 has a test unit—not shown—which is designed such that it automatically provides test data or forwards and/or processes test data, with particular preference test data which are provided by a second communication unit. These test data are respectively written to the status memory unit of the status information processing modules 8, 9 by the interface unit, and the result is assessed with respect to the result that is to be expected. It is thus possible to test the workings of the status information processing modules 8, 9.

As an alternative example, the status information processing modules 8, 9 do not have any short status memory units, but rather the respective short status data item k-stat is made available to the interface unit, which is designed such that it ORs these two short status data items k-stat and produces a total short status data item which is derived therefrom in this manner and which is transmitted to the second communication unit, for example.

The invention claimed is:

1. An electronic communication unit which is in the form of a sensor and/or actuator unit, comprising:
   at least a first status information processing module which has a status memory unit which stores status information for said communication unit in the form of a status data item;
   the first status information processing module further comprising:
      a masking memory unit connected to the status memory unit; and
      a status processing element connected to said masking memory unit,
   wherein the first status information processing module is configured such that at least one status information item from the status data item is selected by the masking memory unit and the resultant selective status data item is processed by the status processing element such that the output of the latter provides a short status data item which has a shorter data word length than the selective status data item.

2. The communication unit as claimed in claim 1, wherein the first status information processing module further comprises a short status memory unit which is connected to the status processing element and to which the short status data item is written.

3. The communication unit as claimed in claim 1, further comprising an interface unit which is connected to the output of the status processing element and/or to the output of the short status memory unit of the first status information processing module and is connected to the masking memory unit of the first status information processing module such that it can change and/or overwrite the bit mask stored in the masking memory unit, as a result of which it is possible to customize the selection of the status types about which the interface unit is provided with information in the form of the short status data.

4. The communication unit as claimed in claim 3, wherein the interface unit is furthermore connected to the status memory unit of the first status information processing module such that it can write to said status memory unit, as a result of which it is possible to write a test status data item to the status memory unit.

5. The communication unit as claimed in claim 3, further comprising at least a second, redundant status information processing module which is essentially configured on the basis of the first status information processing module and is likewise connected to the interface unit in essentially the same way.

6. The communication unit as claimed in claim 3, wherein the communication unit is part of a communication system as a first communication unit and is connected to at least one second communication unit, wherein the interface unit of the first communication unit is configured such that it can transmit to the second communication unit the short status data item in the first and/or the second status information processing module and/or a total short status data item derived from one or both of these data items.

7. The communication unit as claimed in claim 6, wherein the interface unit of the first communication unit is configured such that it writes a test status data item received from the second communication unit directly or in modified form to the status memory unit of the first and/or second status information processing module and then transmits at least one of the resultant short status data items and/or a total short status data item derived therefrom to the second communication unit.

8. The communication unit as claimed in claim 5, wherein the status memory units of the first and second status information processing modules are connected and/or actuated such that the respective status data (stat) from said two status memory units are in the form of mutually inverted data words, at least in relation to status information which the communication unit itself provides.

9. A method for transmitting status information from a first communication unit, which is in the form of a sensor and/or actuator unit, particularly a communication unit according to claim 1, to at least one second communication unit, wherein the first communication unit has at least a first status information processing module having a status memory unit which stores status information from said communication unit in the form of a status data item, comprising:
    selecting at least one status information item from said status data item in the first status information processing module by a masking memory unit,
    processing the resultant selective status data item by a status processing element, and
    providing, by said status processing element, a short status data item which has a shorter data word length than the selective status data item.

10. The method as claimed in claim 9, wherein the at least one short status data item is transmitted to the second communication unit via an interface unit.

11. The method as claimed in claim 10, wherein the second communication unit interprets the short status data item to determine whether the short status data item contains an information item indicating that the second communication unit needs to react thereto, after which, if the presence of such an information item to which the second communication unit needs to react is identified, the second communication unit requests or reads at least the status data item in the first and/or the second status information processing module and/or the second communication unit automatically puts itself into another mode of operation, particularly an emergency mode of operation.

12. The use of the communication unit as claimed in claim 1 in a motor vehicle braking system and/or in a motor vehicle electronic stability control system.

* * * * *

UNITED STATES PATENT AND TRADEMARK OFFICE
CERTIFICATE OF CORRECTION

PATENT NO.       : 8,706,981 B2                                                           Page 1 of 1
APPLICATION NO.  : 13/146443
DATED            : April 22, 2014
INVENTOR(S)      : Schriefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this
Twenty-ninth Day of September, 2015

Michelle K. Lee
*Director of the United States Patent and Trademark Office*